Figure 1:
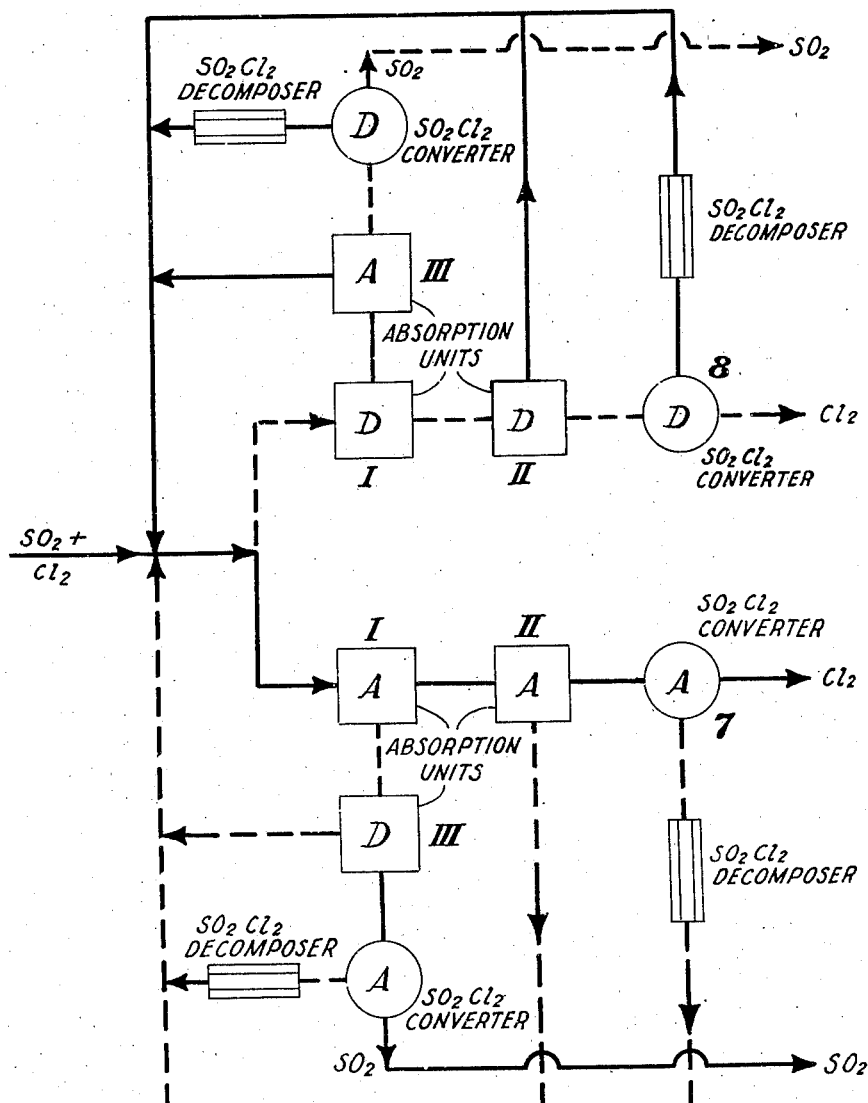

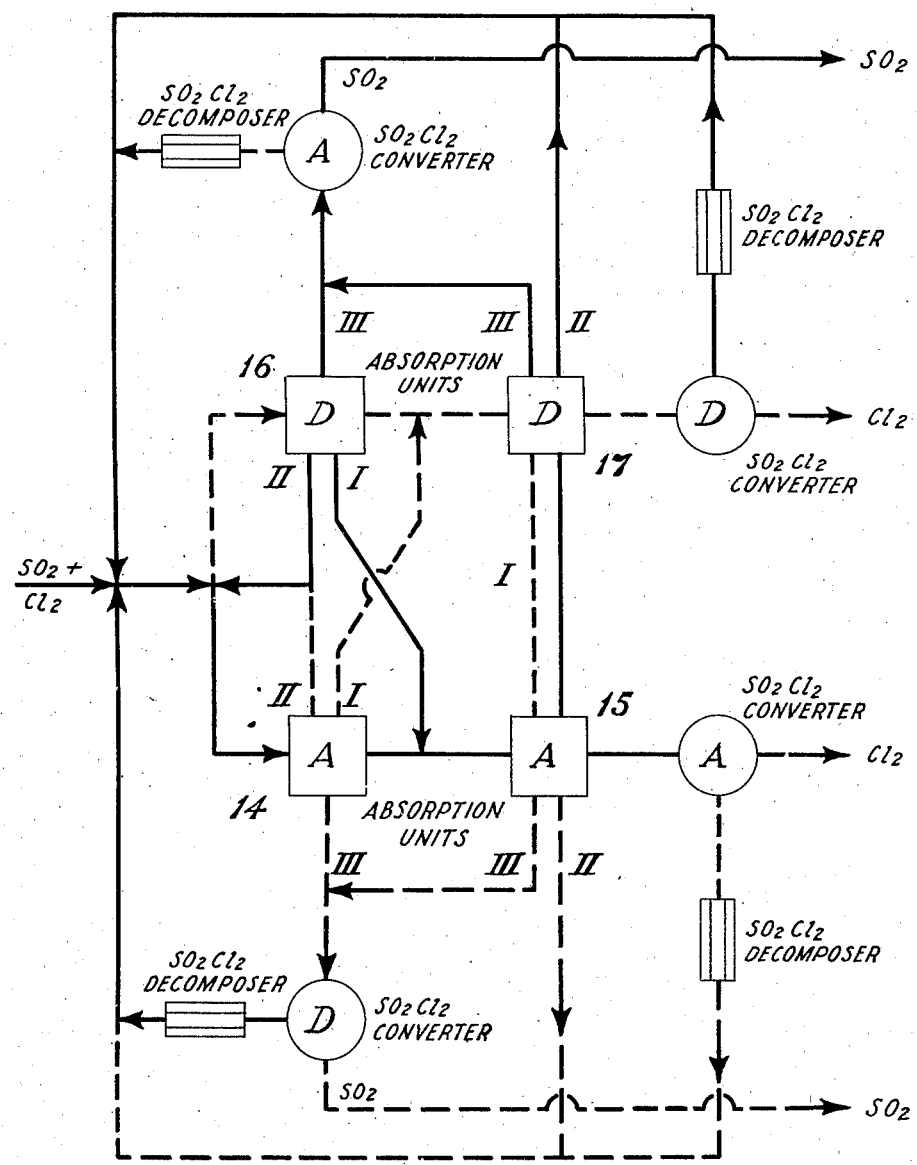

Patented May 1, 1945

2,375,011

UNITED STATES PATENT OFFICE 2,375,011

MANUFACTURE OF CHLORINE

Francis J. McAdam, Cleveland, Ohio, assignor to E. I. du Pont de Nemours & Company, Wilmington, Del., a corporation of Delaware Application December 23, 1939, Serial No. 310,839

11 Claims. (Cl. 23—219)

This invention relates to the manufacture of chlorine and sodium sulfate by the action of sulfur trioxide on sodium chloride and is particularly directed to the recovery of chlorine from mixtures of sulfur dioxide and chlorine. More particularly the invention is directed to processes in which sulfur trioxide is caused to react with sodium chloride to form sodium sulfate and an equimolecular mixture of sulfur dioxide and chlorine, and in which chlorine is recovered from such mixtures by adsorption and desorption of sulfur dioxide on an inorganic capillary absorbent free of uncombined water.

The possibility of obtaining chlorine and sodium sulfate from sulfur, oxygen, and sodium chloride has long been recognized in the art as a desideratum, and numerous proposals have been made for processes which are said to be suitable for obtaining this result. While for one reason or another these processes have not been adopted in the art, it has been amply demonstrated that sulfur trioxide will react with sodium chloride under proper conditions to yield a number of products, including sodium chlorosulfonate, sodium pyrosulfate, sodium sulfate, sulfur dioxide, and chlorine. The intermediate products, sodium chlorosulfonate and sodium pyrosulfate, may be decomposed upon application of heat so that the net result of carrying the reaction to completion is, as illustrated by the following equation, that sulfur dioxide and chlorine are liberated in equimolecular quantities:

$$2NaCl + 2SO_3 \rightarrow Na_2SO_4 + SO_2 + Cl_2$$

The equimolecular mixture of sulfur dioxide and chlorine thus obtained is a highly reactive mixture, and in some respects is more highly reactive because of its equimolecular nature. In the presence of water it is unstable and forms sulfuric acid and hydrochloric acid. It is highly corrosive at high temperatures and is catalyzed to sulfuryl chloride in the presence of activated carbon and numerous other organic substances. The extreme reactive nature of such mixtures have made separation extremely difficult except by purely physical means such as fractional distillation, and even in such cases the close proximity of boiling point and miscibility of the two liquids have made such separations difficult.

I have now found that the gases obtained from the reaction of sulfur trioxide and salt may be separated simply and effectively and without catalysis by passing them in contact with an inorganic capillary adsorbent free of uncombined moisture. I have found that in this manner it is possible preferentially to absorb the sulfur dioxide so that the gases after passing the adsorbent are enriched in chlorine. By using a suitable number of passes the chlorine can be completely freed of sulfur dioxide, or the small quantities of sulfur dioxide remaining after partial separation may be eliminated by other means, as for example by passing the gas mixture in contact with activated carbon to cause the formation of the easily separable sulfuryl chloride or by washing the gas with water or dilute acids or with alkali, in which case sulfur dioxide reacts with chlorine and water to form hydrochloric acid and sulfuric acid which are neutralized if alkali is present.

In carrying out the processes of my invention I obtain sulfur trioxide in any known manner, as for example by the contact conversion of sulfur dioxide. Sulfur trioxide is preferably purified of any undesirable gases which may be present as a result of such processes, as for example by absorption to form oleum or fuming sulfuric acid followed by the application of heat to drive off pure sulfur trioxide. The sulfur trioxide is then caused to act upon sodium chloride in a manner that the products are sodium sulfate, chlorine, and sulfur dioxide. If the reaction is carried out at a temperature above about 450° C. these products will be obtained directly. At a lower temperature sulfur trioxide will be lost as sodium pyrosulfate and at still lower temperatures sulfur dioxide and chlorine are not formed, the product being a sulfur trioxide-addition complex sodium chlorosulfonate. The sodium chlorosulfonate, however, may be decomposed upon heating to yield sodium sulfate, chlorine, and sulfur dioxide. The reaction accordingly may be carried out in a single step by heating above 450° C., but preferably below the melting point of the sodium chloride-sodium sulfate eutectic composition, or it may be carried out in two steps—involving first the formation of sodium chlorosulfonate, and second its decomposition to sodium sulfate, sulfur dioxide, and chlorine.

By these reactions a gas mixture substantially free of other components other than sulfur dioxide and chlorine is obtained and, as previously pointed out, due to mutual oxidation and reduction the sulfur dioxide and chlorine are present in substantially equimolecular quantities. This gas mixture may be separated into its components by means of a suitable preferential adsorption system. Thus, if the gas mixture is first passed in contact with an inorganic capillary adsorbent, then in contact with activated carbon and thereafter in contact with another adsorbent either of the inorganic capillary type or activated carbon or in contact with a scrubbing medium, highly purified chlorine is obtained. The last two steps may be omitted if a partial separation is all that is desired or if a sufficient number of passes over the inorganic capillary adsorbent is made to eliminate the sulfur dioxide completely.

I have found that to obtain efficient adsorption of sulfur dioxide from equimolecular mixtures of sulfur dioxide and chlorine it is not only necessary to avoid adsorbents which catalyze the sulfur dioxide and chlorine to sulfuryl chloride but also that the absorbent be free of uncombined water—in the presence of uncombined water the adsorbed sulfur dioxide and chlorine react to deposit a film of sulfuric acid and hydrochloric acid in the pores of the absorbent. Satisfactory results may be obtained with silica gel, which in the course of its manufacture has been dried down to about 3 to 7 per cent water. It will be understood, however, that in the broader aspects of the invention dehydration of the hydro gel need not be carried out to this extent and that other types of inorganic capillary adsorbents may be used, provided that in any case the adsorbent is entirely free of uncombined water.

I prefer to effect adsorption at a temperature between about −10° C. and about 40° C., and substantially at atmospheric pressure. Superatmospheric pressure may be used if desired, but for any given temperature the pressure should not be so great as to cause liquefaction of sulfur dioxide.

It will be necessary periodically to treat the adsorbent to recover the adsorbed sulfur dioxide. This may be accomplished, as is well known in the art, either by an increase in temperature or by a reduction in pressure as compared with the conditions of temperature and pressure obtaining in the adsorption. Thus, if adsorption is effected under atmospheric pressure and with artificial cooling, desorption may be effected by a reduction of pressure accompanied by cessation of cooling, or if the adsorption is effected at the ambient temperature either at atmospheric or superatmospheric pressure desorption may be effected simply by heating the adsorbent, preferably to a temperature of about 100–150° C. Subatmospheric pressure may also be used to advantage.

The gases evolved on desorption consist predominantly of sulfur dioxide with minor amounts of chlorine. These gases may be passed through a second adsorption-desorption, thus effecting a further separation into two components, one of which consists predominantly of sulfur dioxide with minor amounts of chlorine and the other of which more nearly approaches the proportions of the original mixture. This latter mixture can be recycled to the primary adsorption, thereby to effect further enrichment with respect to chlorine. This same process may be continued in further passes until a sulfur dioxide gas essentially free of chlorine is obtained.

The chlorine in the sulfur dioxide-rich component of the system, whether after a single pass or a multiple pass, may be removed by passing the gas in contact with activated carbon or other substances adapted to promote the reaction between sulfur dioxide and chlorine to form sulfuryl chloride. By passing such gas through a filter packed with activated carbon at a temperature below about 30° C. the sulfuryl chloride will be adsorbed and/or condensed in the filter and the effluent gas will be essentially free of chlorine. Traces of chlorine or sulfuryl chloride may be removed by scrubbing the gas with an aqueous medium. In the presence of water the chlorine and sulfur dioxide react to form hydrochloric acid and sulfuric acid and the sulfuryl chloride is decomposed to the same product. The scrubbing method may be used in lieu of the catalytic formation of sulfuryl chloride, but is uneconomical except in instances where the gas contains only small amounts of chlorine because the products, hydrochloric acid and sulfuric acid, are not ordinarily of sufficient value to justify separation. When the chlorine is removed as sulfuryl chloride, however, the latter may be decomposed and recycled to the adsorption and in this manner the valuable constituent, chlorine, can be recovered.

When the equimolecular mixture of sulfur dioxide and chlorine is passed through the primary absorber the effluent gas is rich in chlorine. This effluent may be used for such purposes as chlorine-rich mixtures of chlorine and sulfur dioxide are desired, but for most purposes will advantageously be further purified of sulfur dioxide. This chlorine-rich mixture may therefore be passed through a second adsorption-desorption and the gases passing through the absorber will be still further enriched with respect to chlorine and the gases evolved on desorption will sufficiently approach the original fifty-fifty mixture that they may be recycled to the initial adsorption. Further passes may be made until the desired chlorine to sulfur dioxide ratio is obtained or until substantially pure chlorine is obtained.

The sulfur dioxide can be removed from the chlorine-rich mixtures by essentially the same processes described for removing chlorine from the sulfur dioxide-rich mixtures. Thus, the sulfur dioxide may be eliminated as sulfuryl chloride by catalysis and the chlorine value recovered by decomposition of the sulfuryl chloride and recirculation of the decomposition gases to the initial adsorption, or an aqueous scrubbing medium may be used to eliminate sulfur dioxide or sulfuryl chloride as hydrochloric acid and sulfuric acid.

In the foregoing I have described preferential adsorption followed by desorption. Still further advantages, however, may be obtained by effecting a combination of preferential adsorption and preferential desorption. To these ends I may treat the adsorbent charged with sulfur dioxide and minor amounts of chlorine in two or more steps to obtain two or more gases containing different proportions of sulfur dioxide and chlorine. I may, for example, carry out the desorption in two steps whereby the gases initially liberated sufficiently approximate the initial fifty-fifty mixture that they may be recycled to the primary adsorption, or when the chlorine is sufficiently in excess of the sulfur dioxide the gases may be mingled with the chlorine-rich gases effluent to the primary adsorption. The sulfur dioxide-rich gas obtained from the second portion of the desorption may be treated in the manner already described. Or, I may carry out the desorption in three stages, co-mingling the first fraction with the chlorine-rich effluent of the primary adsorption, returning the second fraction to the primary adsorption, and treating the last fraction if desired as already described. By these processes I am able to concentrate adsorption and desorption units on the recovery of chlorine and to reduce the number of units necessary for treating the sulfur dioxide-rich gas.

My invention may be more fully understood by reference to the accompanying drawings in which Figures 1 and 2 illustrate two embodiments of the invention. In these flow sheets the solid and dotted lines are used to illustrate alternating flow of gases. The letters A indicate absorption and the letters D indicate desorption.

According to the embodiment of the invention illustrated in Figure 1 an equimolecular mixture of $SO_2$ and $Cl_2$ is passed through absorption units I—A and II—A and through the $SO_2Cl_2$ converter 7, thus yielding chlorine. Simultaneously, unit III—D is being desorbed. The gas evolved passes through the $SO_2Cl_2$ converter yielding $SO_2$. In the upper half the units I and II are being desorbed. Gas from I—D passes into absorption unit III—A and the effluent is returned to source. The evolved gas from II—D is returned to source. $SO_2Cl_2$ from the $SO_2Cl_2$ converter is passed through the $SO_2Cl_2$ decomposer and the resulting gas mixture passed on to source. It will thus be clear that with suitable apparatus and suitable alternation between absorption and desorption all the input of $SO_2$ and $Cl_2$ mixture is separated into substantially pure chlorine and sulfur dioxide. Any final purification of these two gases can be effected by scrubbing in a suitable medium.

According to the embodiment illustrated in Figure 2 the gas mixture is led through absorption units 14 and 15 through the $SO_2Cl_2$ converter yielding chlorine. The desorption is effected in multiple stages as represented by the Roman numerals I, II and III. Thus the gas evolved from unit 16 on desorption in the first stage is passed on into absorber unit 15 which is on absorption, and the gas evolved in the second stage is returned to source. The gas evolved in the third and final stage is passed on into the $SO_2Cl_2$ converter yielding $SO_2$. In unit 17 on desorption the gas evolved in the first stage is led to absorption unit 15 on absorption. During the second stage of the desorption the gas is returned to source, and in the third stage of the desorption the gas is passed to the $SO_2Cl_2$ converter yielding $SO_2$. The $SO_2Cl_2$ formed in the $SO_2Cl_2$ converters is decomposed, yielding mixtures of $SO_2$ and $Cl_2$ which are returned to source. It is thus evident that with suitable apparatus and suitable alternation of absorption and desorption the principles of my invention may be utilized to effect complete separation of mixtures of $SO_2$ and $Cl_2$.

I am aware that it has been heretofore proposed to use silica gel as an adsorbent for the recovery of chlorine from gas mixtures, and it will be understood by those skilled in the art that apparatus useful for this purpose, for example, as described in Patent 1,617,305 granted February 8, 1927, to J. A. Guyer and M. C. Taylor, may be used in carrying out the processes of my invention. I am also aware that it has been heretofore proposed to adsorb sulfur dioxide with silica gel, as for example in refrigerating systems. As far as I am aware, however, it has not been heretofore proposed to separate mixtures of sulfur dioxide and chlorine in the manner herein described. In the processes heretofore available chlorine has been separated from very low boiling impurities such as hydrogen, oxygen, nitrogen, etc., by adsorption of the chlorine in preference to the impurity. Moreover, in none of these processes is there any recognition that uncombined water is a deleterious component in the adsorbent. In Guyer et al., for example, the recovered chlorine is subjected to drying before liquefaction.

While I have described my invention particularly with reference to equimolecular mixtures of sulfur dioxide and chlorine it will be understood that it may be practiced with mixtures of these two gases in other proportions, and that other gases of the so-called permanent type such as are present in atmospheric air may be present without deleteriously affecting the separation.

I claim:

1. In the manufacture of chlorine the method which includes the steps of causing sulfur trioxide to act on sodium chloride in a manner such that a gaseous mixture containing sulfur dioxide and chlorine in substantially equal proportions is evolved, contacting said gaseous mixture with a non-catalytic, inert, inorganic capillary adsorbent free of uncombined water having a higher affinity for sulfur dioxide than for chlorine until the adsorbed gas contains a greater proportion of sulfur dioxide than said gaseous mixture and the unadsorbed gas contains a greater proportion of chlorine than said gaseous mixture, withdrawing and isolating the unabsorbed gases and expelling and isolating the adsorbed gases from the adsorbent.

2. In the manufacture of chlorine the method which includes the steps of causing sulfur trioxide to act on sodium chlorine in a manner such that a gaseous mixture containing sulfur dioxide and chlorine in substantially equal proportions is evolved, contacting said gaseous mixture with a silica gel which has been dried down to about 3 to 7 per cent water until the adsorbed gas contains a greater proportion of sulfur dioxide than said gaseous mixture and the unadsorbed gas contains a greater proportion of chlorine than said gaseous mixture withdrawing and isolating the unabsorbed gases and expelling and isolating the adsorbed gas from the adsorbent.

3. In the manufacture of chlorine the method of obtaining chlorine from gaseous mixtures containing sulfur dioxide and chlorine which includes the steps of contacting said gaseous mixture with a non-catalytic, inert, inorganic capillary adsorbent free of uncombined water having a higher affinity for sulfur dioxide than for chlorine until the adsorbed gas contains a greater proportion of chlorine than said gaseous mixture, withdrawing and isolating the unabsorbed gases and expelling and isolating the adsorbed gas from the adsorbent.

4. In the manufacture of chlorine the method of obtaining chlorine from gaseous mixtures containing sulfur dioxide and chlorine which includes the steps of contacting said gaseous mixture with a silica gel which has been dried down to about 3 to 7 per cent water until the adsorbed gas contains a greater proportion of sulfur dioxide than said gaseous mixture and the unadsorbed gas contains a greater proportion of chlorine than said gaseous mixture, withdrawing and isolating the unabsorbed gases and expelling and isolating the adsorbed gas from the adsorbent.

5. In the manufacture of chlorine the method of obtaining chlorine from gaseous mixtures containing sulfur dioxide and chlorine which includes the steps of contacting said gaseous mixture with a non-catalytic, inert, inorganic capillary adsorbent free of uncombined water until having a higher affinity for sulfur dioxide than for chlorine until the adsorbed gas contains a greater proportion of sulfur dioxide than said gaseous mixture and the unadsorbed gas contains a greater proportion of chlorine than said gaseous mixture, withdrawing and isolating the unadsorbed gases, expelling and isolating a portion of the adsorbed gas and expelling and isolating the balance of the adsorbed gas whereby the adsorbed gas is regenerated in two fractions one of which is relatively rich in chlorine.

6. In the manufacture of chlorine the method of obtaining chlorine from gaseous mixtures containing sulfur dioxide and chlorine which includes the steps of contacting said gaseous mixture with a silica gel adsorbent which has been dried down to about 3 to 7 per cent water until the adsorbed gas contains a greater proportion of sulfur dioxide than said gaseous mixture and the unadsorbed gas contains a greater proportion of chlorine than said gaseous mixture, withdrawing and isolating the unadsorbed gas, expelling and isolating a portion of the adsorbed gas from the adsorbent and expelling and isolating the balance of adsorbed gas from the adsorbent.

7. In the manufacture of chlorine the method of obtaining chlorine from gaseous mixtures containing sulfur dioxide and chlorine which includes the steps of contacting said gaseous mixture with a non-catalytic, inert, inorganic capillary adsorbent free of uncombined water having a higher affinity for sulfur dioxide than for chlorine until the adsorbed gas contains a greater proportion of sulfur dioxide than said gaseous mixture and the unadsorbed gas contains a greater proportion of chlorine than said gaseous mixture, withdrawing and isolating the unadsorbed gas, expelling and isolating a portion of the adsorbed gas from the adsorbent, expelling and isolating the balance of the adsorbed gas from the adsorbent, whereby a plurality of gas mixtures each containing different proportions of sulfur dioxide and chlorine are obtained, contacting at least one of said gas mixtures with a non-catalytic, inert, inorganic capillary adsorbent free of uncombined water until having a higher affinity for sulfur dioxide than for chlorine until the adsorbed gas contains a greater proportion of sulfur dioxide than said gas mixture and the unadsorbed gas contains a greater proportion of chlorine than said gas mixture, withdrawing the unadsorbed gas from the said second adsorbent, and expelling the adsorbed gas from said second adsorbent.

8. In the manufacture of chlorine the method of obtaining chlorine from gaseous mixtures containing sulfur dioxide and chlorine which includes the steps of contacting said gaseous mixture with a silica gel which has been dried down to about 3 to 7 per cent water until the adsorbed gas contains a greater proportion of sulfur dioxide than said gaseous mixture and the unadsorbed gas contains a greater proportion of chlorine than said gaseous mixture, withdrawing and isolating the unadsorbed gas, expelling and isolating a portion of the adsorbed gas from the adsorbent, expelling and isolating the balance of the adsorbed gas from the adsorbent, whereby a plurality of gas mixtures each containing different proportions of sulfur dioxide and chlorine are obtained, contacting at least one of said gas mixtures with a silica gel which has been dried down to about 3 to 7 per cent water until the adsorbed gas contains a greater proportion of chlorine than said gas mixture, withdrawing the unadsorbed gas from said second adsorbent, and expelling the adsorbed gas from said second adsorbent.

9. In the manufacture of chlorine the method of obtaining chlorine from gas mixtures containing sulfur dioxide and chlorine in substantially equal proportions which includes the step of contacting said gas mixture with a silica gel adsorbent which has been dried down to about 3 to 7 per cent water until the adsorbed gas contains a greater proportion of sulfur dioxide than said gas mixture and the unadsorbed gas contains a greater proportion of chlorine than said gas mixture, withdrawing and isolating the unabsorbed gas, expelling and isolating the adsorbed gas from said adsorbent, said adsorption and expelling being so carried out as to provide a plurality of gas mixtures containing sulfur dioxide and chlorine in other than substantially equal proportions, contacting at least one of said last-named mixtures with a silica gel which has been dried down to about 3 to 7 per cent water until the adsorbed gas contains a greater proportion of sulfur dioxide than said gas mixture contacted with said second adsorbent and the unadsorbed gas contains a greater proportion of chlorine, withdrawing the unadsorbed gas from said second adsorbent and expelling the adsorbed gas from said second adsorbent.

10. In a process for separating substantially equal mixtures of chlorine and sulfur dioxide the steps of contacting said mixture with a non-catalytic, inert, inorganic capillary adsorbent free of uncombined water which has a greater affinity for sulfur dioxide than for chlorine until the unadsorbed gas is enriched with chlorine, contacting chlorine enriched gas with a non-catalytic, inert, capillary adsorbent free of uncombined water which has greater affinity for sulfur dioxide than for chlorine, expelling the adsorbed gas from the last-named adsorbent and co-mingling the gas mixture thus obtained with the first-named gas mixture.

11. In a process for separating substantially equal mixtures of chlorine and sulfur dioxide the steps of contacting said mixture with a non-catalytic, inert, inorganic capillary adsorbent free of uncombined water which has a greater affinity for sulfur dioxide than for chlorine until the unadsorbed gas is enriched with chlorine, treating the adsorbent to regenerate a plurality of fractions each containing different proportions of chlorine and sulfur dioxide, contacting at least one of said fractions with a non-catalytic, inert, capillary adsorbent free of uncombined water which has greater affinity for sulfur dioxide than for chlorine, expelling the adsorbed gas from the last-named adsorbent whereby in carrying out the foregoing steps a multiplicity of gas mixtures are produced and co-mingling the gas mixtures thus obtained having substantially the same proportions of chlorine and sulfur dioxide.

FRANCIS J. McADAM.